(12) United States Patent
Durling

(10) Patent No.: US 8,485,531 B2
(45) Date of Patent: Jul. 16, 2013

(54) OIL SEAL ASSEMBLY

(75) Inventor: Christopher J. Durling, Bristol (GB)

(73) Assignee: Rolls-Royce, PLC, London (GB)

( * ) Notice: Subject to any disclaimer, the term of this patent is extended or adjusted under 35 U.S.C. 154(b) by 261 days.

(21) Appl. No.: 12/876,378

(22) Filed: Sep. 7, 2010

(65) Prior Publication Data
US 2011/0068541 A1 Mar. 24, 2011

(30) Foreign Application Priority Data
Sep. 24, 2009 (GB) ................................ 0916736.2

(51) Int. Cl.
*F16J 15/04* (2006.01)
(52) U.S. Cl.
USPC ........................................................ 277/421
(58) Field of Classification Search
USPC .................................. 277/411, 412, 413, 421
See application file for complete search history.

(56) References Cited

U.S. PATENT DOCUMENTS

| | | | |
|---|---|---|---|
| 4,406,459 A | 9/1983 | Davis et al. | |
| 6,540,231 B1 * | 4/2003 | Trantow et al. | 277/355 |
| 6,840,519 B2 * | 1/2005 | Dinc et al. | 277/413 |
| 2002/0117807 A1 * | 8/2002 | Yoshida et al. | 277/412 |
| 2007/0025835 A1 | 2/2007 | Gockel et al. | |

FOREIGN PATENT DOCUMENTS

| | | |
|---|---|---|
| EP | 0 818 607 A3 | 1/1998 |
| WO | WO 97/26475 | 7/1997 |

OTHER PUBLICATIONS

European Search Report issued in European Application No. EP10175386 dated Jan. 31, 2011.
British Search Report dated Jan. 20, 2010 issued in British Patent Application No. 0916736.2.
Feb. 7, 2011 Search Report issued in European Patent Application No. 10175386.1.

* cited by examiner

*Primary Examiner* — Gilbert Lee
(74) *Attorney, Agent, or Firm* — Oliff & Berridge, PLC

(57) ABSTRACT

The invention concerns an oil seal assembly 12, especially for a gas turbine engine, for use in situations, for example, where a shaft passes 2 through the wall of a bearing chamber 10, so that one side of the seal is in a "wet" zone 8 and the other side in a "dry" zone 14. The seal comprises two parts, a relatively stationary annular seal member 32 which runs against the surface 34 of a seal runner 36 carried by the rotatable shaft 2. Both parts of seals of this kind are designed to be a demountable service items. Usually the seal runner 36 is bolted to a flange 16 on the shaft 2. However, problems may arise with oil leakage through the bolt holes formed in the flange 16 and along the bolt threads. In order to solve these problems the invention proposes a double flange arrangement 42, 44, 46 (FIG. 3) in which the seal runner 36 spans both flanges 42, 44 and is secured to the flange 42 in the dry zone 14.

7 Claims, 2 Drawing Sheets

OIL SEAL ASSEMBLY

BACKGROUND

The invention relates to an oil seal assembly.

In particular, the invention concerns an oil seal assembly for a gas turbine engine, especially but not exclusively an aero gas turbine engine. Except where a lubrication system is designed for total loss, it is usual to take steps to minimise or prevent even small oil leaks especially in locations where a leak may leave a visible, tell-tale mark. Therefore oil seals are normally located where a rotating shaft emerges from a zone containing lubricant. One example of such arrangement occurs at the front of the engine where the main engine shaft extends forwards to drive a low pressure fan or external equipment such as a lift fan.

The three most common types of oil seal used in gas turbine engines are labyrinth seals, brush seals and carbon seals, although in some instances a close tolerance may be considered a seal. Labyrinth and brush seals are not inherently oil tight so that where zero leakage is an objective carbon seals are employed. The performance of all types of seal is improved where a pressure differential is maintained across the seal during operation with the higher pressure on the outside of a bearing housing to ensure that air leaks inwards adding to the effectiveness of the seal. Oil leaking past a seal may cause a safety or fire hazard and anyway causes unsightly oil stains, therefore, it is desirable for several reasons to take all possible measures to eliminate oil leakage.

For ease of reference hereinafter regions or volumes containing lubricant will be referred to as a "wet" zone and a lubricant free region will be referred to as a "dry" zone. So, for example, the interior of a bearing chamber or gearbox may be referred to as a wet zone while the region external thereto will be referred to as a dry zone. Generally, carbon seals are used for sealing oil within bearing chambers and gearboxes. The carbon sealing element is carried in a seal housing located in the bearing housing and bears against a seal runner carried on the rotating element, for example, the shaft. The carbon sealing element rubs against the relatively rotating seal runner theoretically, at least, eliminating the leakage gap and thereby confining lubricant to the wet zone, effectively preventing loss of lubricant into a dry zone. The seal element and the seal runner are mounted concentrically with the carbon seal element located in the wall of the bearing chamber, usually comprising several interlocking segments carried in a mounting capsule to permit limited radial movement. The carbon seal element bear against the surface of the seal runner which, in turn, is supported so that the heat generated by the rubbing action of the seal element on the surface of the runner may be dissipated by directing oil onto an under surface of the runner. Seals and seal runners of this kind are intended to be replaceable at service intervals and so are designed to be demountable.

SUMMARY

The seal runner has a cylindrical seal surface and is typically provided with an annular flange by means of which it is bolted to a matching flange on the engine shaft. However, in this kind of arrangement the mounting flanges are pierced by bolt holes to receive the seal runner mounting bolts and, therefore the bolt holes and bolt threads constitute a potential leakage path for oil between from the "wet" zone into the "dry" zone. A possible solution to this problem is to screw the securing bolts into blind holes, but, for bolt locking and repair/replacement ability, thread inserts are required in the blind bolt holes and inserts cannot be installed with sufficiently consistent positional accuracy to eliminate balancing problems. In any case such arrangements are expensive to machine and add weight. The present invention is intended to provide a seal runner mounting configuration which overcomes these drawbacks.

According to the present invention there is provided an oil seal assembly for preventing leakage from a wet zone into a dry zone through a leakage gap between relatively rotatable first and second parts, comprising an annular seal member carried in an annular housing in a first part, which bears against a cylindrical seal surface of an annular seal runner carried by an annular flange member on the second part, wherein the seal runner is secured to the second part in the dry zone; wherein the annular flange member on the second part comprises a double flange arrangement including a first, proximal section carried on the second part in the wet zone, and a second, distal section carried in the dry zone.

In a preferred form of the invention the first and second annular flange sections are concentric, spaced apart axially and joined towards their greater diameters by a concentric cylindrical section.

Preferably the seal runner is attached to the second, distal flange section in the dry zone and the cylindrical seal surface of seal runner is cantilevered into the wet zone.

The invention will now be described in more detail with reference to the arrangements illustrated in the accompanying drawings by way of example. In the accompanying drawings like parts carry like reference numerals, and

DETAILED DESCRIPTION OF EMBODIMENTS

Figure 1:
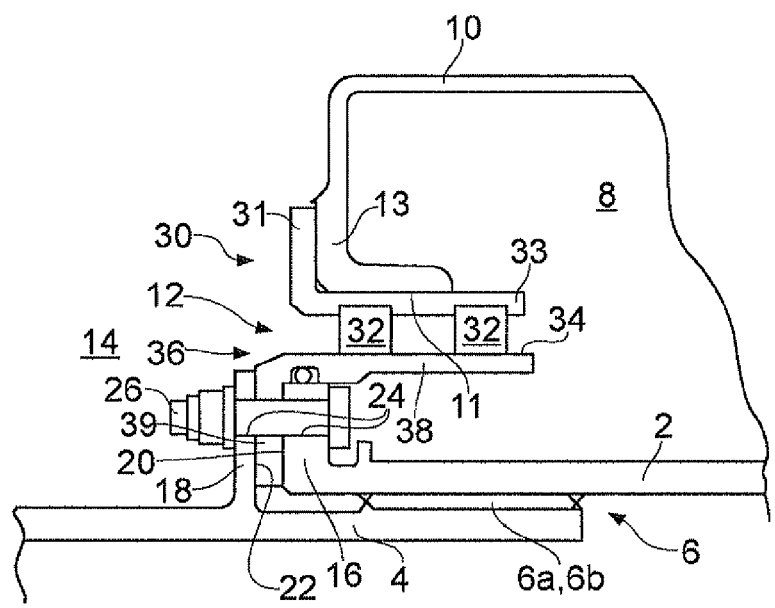
FIG. 1 shows a conventional oil seal arrangement.

The conventional oil seal arrangement illustrated in the drawing of FIG. 1 is part of the transmission system of an aero gas turbine engine, but such an arrangement could be used in a land based (eg power generation or pumping) or in a marine based (eg ship propulsion) installation. In such an installation, of which the drawing shows only a small part, a main driving shaft 2 which runs the axial length of the engine is coupled to an external drive transmission shaft 4 by a known spline arrangement indicated generally at 6. In an aero engine turbofan installation typically the shaft 4 would carry the low pressure fan, while in an installation driving external equipment such as an electric generator or a pump the shaft 4 would extend forward to connect to the drive shaft of the appropriate external apparatus. The examples are not intended to be exclusive of applications of the invention.

The view of FIG. 1 shows a cross-section through the engine axis of the oil seal arrangement at the location in the engine where the driving shaft emerges through the wall of the forwardmost bearing chamber. The driving shaft 2 is supported by a bearing arrangement (not shown) located within a bearing chamber, generally indicated at 8, to which lubricant is supplied by the engine internal oil system. The bearing chamber 8 has an external wall 10 in which there is formed an aperture 11 through which the shaft 2 passes. The leakage gap which occurs where shaft 2 passes through the aperture 11 is closed by an oil seal arrangement generally indicated at 12, which separates the "wet" interior of the bearing chamber 8 from the "dry" external environment 14. In general terms, aperture 11 is circular and surrounded by a boss 13 formed as an integral part of the bearing chamber wall 10. The internal diameter of aperture 11 is selected and finish-machined to receive the stationary part of oil seal 12.

The main driving shaft 2 essentially comprises a hollow tube formed internally with a set of longitudinally extending, radial splines 6a and a terminal flange 16 by means of which the driving and driven shafts 2, 4 are secured together. The driven shaft 4 also comprises a hollow tube formed with a set of complementary, external splines 6b which are slidingly engaged with the splines 6a to transmit driving torque between the shafts. Generally, as in the installation from which the present example is drawn, the interior spaces of the hollow shafts is not a wet zone, that is oil is not supplied to the interior of the shafts 2, 4. Thus, oil leakage along the spines 6a, 6b does not arise. In this example only the oil seal arrangement 12 adjacent the shaft bearing is potentially the sole cause for concern.

The oil seal 12 comprises a stationary part located in the aperture 11 in the bearing chamber wall 10, as mentioned above, and a relatively moving part carried by the rotating parts 2, 4. The stationary part consists of a seal housing 30 in which is mounted at least one annular seal member 32 which bears against the cylindrical seal surface 34 of an annular seal runner 36 carried on the shaft 2. The housing 30 is secured in the appropriately dimensioned aperture 11 formed in the bearing chamber wall 10, and is located axially by an external, outwardly extending, annular lip 31 which bears against an external face of the seal housing boss 13 when the seal housing is fully seated. The seal member(s) 32 are carried within a cylindrical portion 33 of seal housing 30. The external dimensions of cylindrical portion 33 are a close fit within the internal dimensions of aperture 11 so that the stationary part of the seal remains in position during operation of the engine and is oil tight.

The relatively rotatable part of the oil seal, that is the seal runner 36, consists of a cylindrical portion 38 the seal surface of which, when installed, is concentric with the axes of shafts 2, 4 and in operation runs co-axially with the annular seal member 32. The cylindrical portion 38 of the seal runner is provided with an annular flange member 39 at one end thereof which is adapted to be secured to the main shaft 2. In this case the flange 39 is clamped between the terminal flange 16 on main shaft 2 and a matching flange 18 on shaft 4. The flanges 16, 18 have similar external diameters, are machined to parallel contact faces 20, 22 and are drilled with rings of holes 24 at the same pitch circle diameters to receive a plurality of clamp bolts, one of which is shown at 26.

Figure 2A:
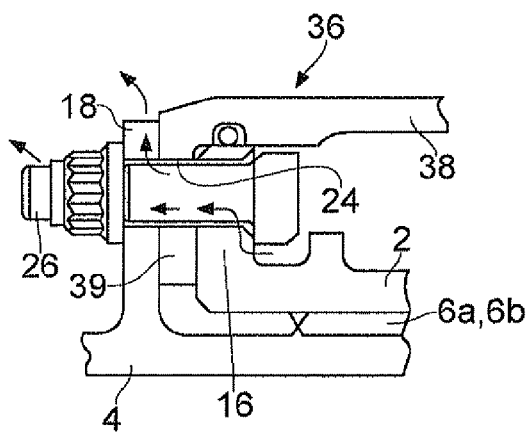
FIGS. 2a and 2b show typical oil leakage paths found in arrangements of the kind illustrated in FIG. 1.
Figure 2B:
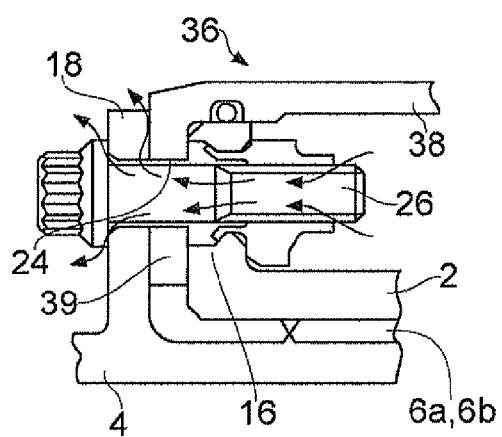

Since the flanges 16, 18 are on the exterior side of the bearing chamber wall 10, the seal runner 36 is secured in the dry zone and its cylindrical portion 38 carrying the seal surface 34 is cantilevered into the wet zone. For ease of maintenance both sections of the oil seal 12 may be inserted and changed from the dry zone without disturbing the main engine driving shaft 2. However, as indicated by the arrows in FIGS. 2a and 2b, it is found in practice that an oil leakage path or paths exist past the flange securing bolts 26 through bolt holes 24, and along the threads of the bolt 26 and their nuts.

Notwithstanding the high temperatures found throughout a gas turbine engine during operation, there is a need to cool the seal runner 36, in particular the cylindrical portion 38 in order to dissipate heat generated by the rubbing action of the seal members 32 against the runner surface 34. In the example being described this is accomplished by directing a jet of lubricant inside the bearing chamber onto the underside of the seal runner 36, thus a plentiful supply of lubricant is present in the immediate vicinity of the flange securing bolts 26.

The present invention seeks to provide a solution to these drawbacks by eliminating the potential leakage path(s) via the flange bolt holes and/or the bolts. According to one aspect of the invention an oil seal assembly includes a double flange arrangement on the driving member so that the flange carrying the seal runner is located in the dry zone. According to another aspect the flange and flange securing bolts used to secure the shaft coupling do not penetrate the wet zone.

Figure 3:
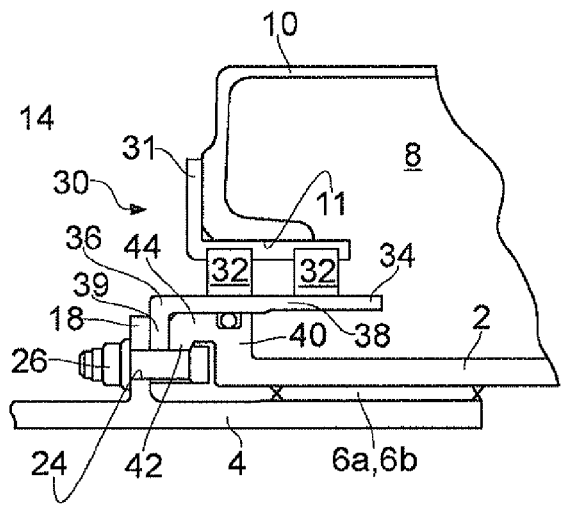
FIG. 3 shows an oil seal arrangement, equivalent to the arrangement of FIG. 1, incorporating the invention.

FIG. 3 of the drawings shows an oil seal arrangement similar to the oil seal arrangement of FIG. 1 modified in accordance with the invention, like parts carry like references. Essentially, the oil seal 12 including the seal runner 36 is unchanged, but the seal runner is carried by a double flange arrangement rather than the single flange arrangement of the prior art. The flange on the driving shaft, that is on main engine shaft 2, that carries the seal runner comprises, instead of a plain shaft, a modified flange consisting of co-axial, annular flange sections 40, 42 spaced apart axially by a concentric cylindrical section 44 which joins the flanges 40, 42 towards their greater diameters. This modified flange arrangement thus comprises a first, proximal section 40 secured to or formed integrally with the shaft 2 which is disposed in the wet zone, and a second and overhanging, distal section 42 is disposed the dry zone.

The diameter of flange section 40 is equal to the inner diameter of the cylindrical section 38 of seal runner 36. A second flange section 42 is spaced apart axially from the first flange by a concentric cylindrical section 44. This second flange at the distal end of the driving shaft is located, therefore, entirely within the dry zone 14. The driven shaft is coupled to the driving shaft in the same way as previously. The external splines 6b on shaft 4 are engaged with the internal splines 6a on shaft 2 up to the limit determined by the positions of flanges 42 and 18. As before the seal runner is located axially by clamping the flange portion 39 between flanges 40 and 42. However, the seal runner 36 remains projecting into the wet zone in the interior of the bearing chamber where it continues to be cooled by a jet or jets of lubricating oil directed at its underside. The shafts 2, 4 are clamped together by securing the flange 18 on driven shaft 4 to the second flange 42 on the driving shaft 2, and the seal runner 36 continues to be secured to the shafts 2, 4 at the bolted flange joint. The flange clamping bolts 26 are located in blot holes in the two flanges, as before, but now both ends of the bolts are located entirely within the dry zone and no lubricating oil is present to seep along bolt threads or through flange bolt holes. A completely oil-tight configuration is assured because no holes penetrate the inner of the double flanges, only the flange in the dry zone is pierced by bolt holes.

Figure 4:
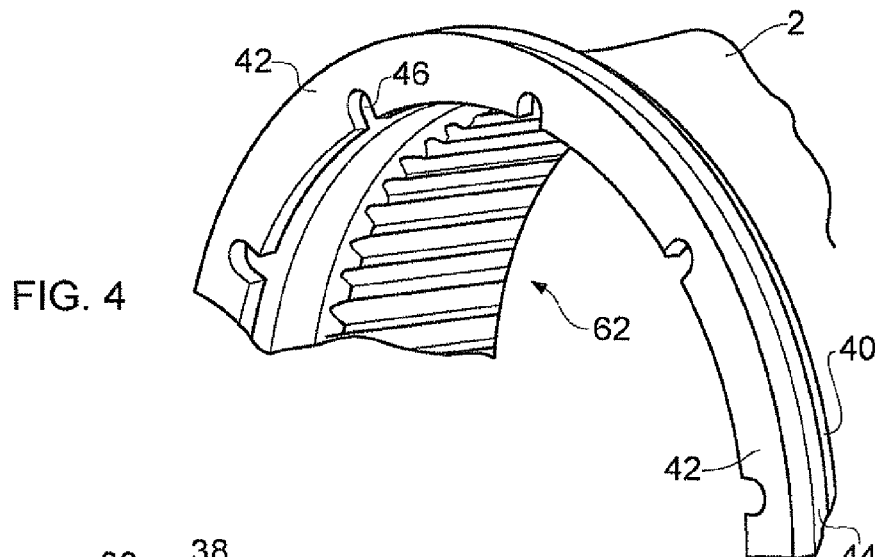
FIG. 4 shows a detail view of the double flange adapted for carrying the seal runner in the arrangement of FIG. 3.

FIG. 4 is an isometric view of the distal end of driving shaft 2 showing the double flange arrangement and the method by which the coupling clamp bolts are located. Typically in a gas turbine engine, space, or lack of it, is a major concern and the maximum permissible dimensions of the flanges 40, 42 and their joining section 44 are not large enough to permit the outside shaft flange 42 to be drilled with bolt holes and for the bolts to be assembled in a conventional manner. Therefore, in order to facilitate assembly the outer flange 42 is formed with slots 46, instead of holes, extending in a radially outward direction from the inner flange circumference to receive the flange securing bolts. During assembly the bolts 26 are loaded into the slots 46 before the seal runner 36 is offered up to the flange 42, followed by the driven shaft 4 and flange 18. Since space is usually at such a premium the most compact arrangement is to use bolts having D-heads or T-heads, with the inner surface of section 44 sculpted to engage the flats of the bolt heads, then as the bolts are tightened they will not rotate.

Figure 5:
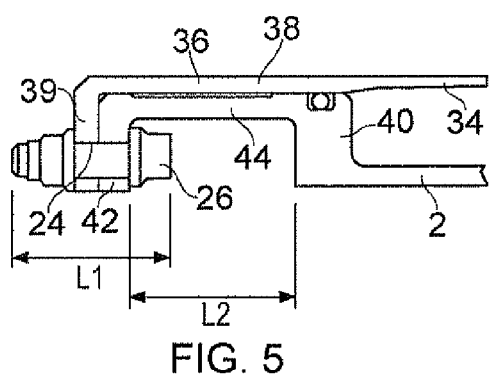
FIG. 5 shows a detail view of an alternative double flange configuration for an arrangement of the kind illustrated in FIG. 3.

FIG. 5 shows a detail view of a variation of this arrangement in which space limitations, that is where distance L2 is greater than distance L1, do not prevent the use of conventional bolt holes 24 in all flanges. Again like parts carry like references not withstanding the differences in dimensions compared with FIG. 4.

The section 44 and flange 40 may be provided around each bolt, thus forming a number of discrete housing features around the circumference of shaft 2. This embodiment provides a significant weight saving since only the flange 42 extends as a continuous ring around the circumference of the shaft 2, with the section 44 and flange 40 being provided only at the bolt 26 location to bound the bolt 26. If required, an additional sealing member is provided between the seal runner 36 and at least one of the flange 40,42 or section 44.

The above described embodiments of the invention are given by way of example only and are not intended to be exclusive, variations within the scope of the invention as hereinafter defined in the claims are possible.

The invention claimed is:

1. An oil seal assembly for preventing leakage from a wet zone into a dry zone through a leakage gap between relatively rotatable first and second parts, comprising:

an annular seal member carried in an annular housing in the first part, which bears against a cylindrical seal surface of an annular seal runner carried by an annular flange member on the second part, the annular flange member on the second part comprises a double flange arrangement including a first, proximal section carried on the second part in the wet zone, and a second, distal section carried in the dry zone, wherein the seal runner is secured to the second part by a bolt, the bolt being entirely in the dry zone.

2. An oil seal assembly as claimed in claim 1 wherein the cylindrical seal surface of seal runner is cantilevered into the wet zone.

3. An oil seal assembly as claimed in claim 1 wherein the second part has annular flange sections that are spaced apart axially and joined towards their greater diameters.

4. An oil seal assembly as claimed in claim 3 wherein the annular flange sections of the second part are joined by a concentric cylindrical section.

5. An oil seal assembly as claimed in claim 1 wherein the seal runner is attached to the second, distal flange section in the dry zone.

6. An oil seal assembly as claimed in claim 1 wherein the seal runner is attached to the second flange section by the bolt, wherein the bolt comprises a plurality of bolts.

7. An oil seal assembly as claimed in claim 6 wherein the plurality of bolts are engaged with a like plurality of receiving slots formed in the inner periphery of the second flange section.

* * * * *